United States Patent [19]

Vatsaas et al.

[11] Patent Number: 5,704,461
[45] Date of Patent: Jan. 6, 1998

[54] ROTATIONAL CONTROL APPARATUS

[75] Inventors: Rick Vatsaas, Eagan; Virgil Schieffer, White Bear Lake; Tom Bydalek, North St. Paul; Todd Smith, Mound, all of Minn.

[73] Assignee: Horton, Inc., Minneapolis, Minn.

[21] Appl. No.: 503,016

[22] Filed: Jul. 17, 1995

[51] Int. Cl.$^6$ ............................................. F16D 25/0635
[52] U.S. Cl. ........................ 192/85 A; 92/106; 92/165 R; 277/165; 277/177
[58] Field of Search .................... 192/85 A, 91 A, 192/85 CA, 70.19, 70.28, 66.32, 85 R, 85 AA, 85 AB, 18 A; 188/72.3, 73.43, 73.44; 92/165 R, 106, 107; 277/27, 165, 167.5, 168, 177

[56] References Cited

U.S. PATENT DOCUMENTS

| | | | |
|---|---|---|---|
| 2,143,861 | 1/1939 | Clouse | 192/70.28 X |
| 2,523,501 | 9/1950 | Davies | 192/70.28 |
| 2,698,676 | 1/1955 | Eason | 192/91 A X |
| 2,747,714 | 5/1956 | Eason . | |
| 2,942,708 | 6/1960 | Eason . | |
| 3,017,861 | 1/1962 | Dobrikin | 277/177 X |
| 3,019,739 | 2/1962 | Prosser | 277/177 X |
| 3,033,578 | 5/1962 | Kellogg . | |
| 3,055,670 | 9/1962 | Sampson | 277/168 |
| 3,174,350 | 3/1965 | Hamish et al. . | |
| 3,199,646 | 8/1965 | McBride | 192/85 AA |
| 3,213,984 | 10/1965 | Cook . | |
| 3,295,394 | 1/1967 | Whateley . | |
| 3,360,274 | 12/1967 | Grant . | |
| 3,727,731 | 4/1973 | Selig | 92/165 R X |
| 3,796,514 | 3/1974 | DuFrene . | |
| 3,927,891 | 12/1975 | Larker et al. . | |
| 3,974,896 | 8/1976 | Rach | 192/72.3 X |
| 4,074,663 | 2/1978 | Cory . | |
| 4,182,215 | 1/1980 | Green et al. | 92/107 X |
| 4,416,458 | 11/1983 | Takenaka et al. . | |
| 4,425,993 | 1/1984 | Schilling . | |
| 4,427,102 | 1/1984 | Schilling . | |
| 4,460,079 | 7/1984 | Hanks . | |
| 4,557,506 | 12/1985 | Hanks et al. . | |
| 4,630,718 | 12/1986 | Hanks . | |
| 4,635,778 | 1/1987 | Lederman . | |
| 4,750,595 | 6/1988 | Dayen et al. . | |
| 4,766,986 | 8/1988 | Dayen et al. . | |
| 4,846,325 | 7/1989 | Mohan . | |
| 5,088,745 | 2/1992 | Peppiatt et al. . | |
| 5,137,131 | 8/1992 | Enomoto | 192/70.19 X |
| 5,257,684 | 11/1993 | Collins . | |

FOREIGN PATENT DOCUMENTS 2087487  5/1982  United Kingdom .

*Primary Examiner*—Richard M. Lorence
*Attorney, Agent, or Firm*—Peterson, Wicks, Nemer & Kamrath, P.A.

[57] ABSTRACT

Rotational control apparatus (A) in the preferred forms of fan clutches is disclosed including shoulder bolts (78) extending through axially extending voids (146) formed in axially extending portion (66) and flange (76) of first and second shell housings (62, 68). The shoulder bolts (78) secure the shell housings (62, 68) together to prevent relative movement therebetween. The apparatus (A) further includes a piston (80) having tabs (144) extending from the outer periphery thereof into the voids (146) and including openings having bushings (134) therein for slideable receipt on the shoulder bolts (78). Springs (138) are mounted on standoffs (210) extending in the voids (146) and abutting with the shoulder of the shoulder bolts (78). A first O-ring (94, 234) is received on an axially extending, outer cylindrical surface of a first shoulder (92, 232) such that fluid pressure received in a cylinder (C) pushes the first O-ring (94, 234) against the annular, radially extending surface of the first shoulder (92, 232). In a preferred form, a second O-ring (238) is received on an axially extending outer cylindrical surface of a second shoulder (236). A step (240) includes an annular, radially extending surface for pushing the second O-ring (238) towards the annular, radially extending surface of the second shoulder (236) in the absence of fluid pressure in the cylinder (C).

20 Claims, 2 Drawing Sheets

ROTATIONAL CONTROL APPARATUS

BACKGROUND

The present invention generally relates to rotational control apparatus, relates particularly to clutches, and relates specifically to fan clutches.

Although fan clutches of the type shown in U.S. Pat. Nos. 3,253,687; 4,418,807; and 4,425,993 have proven to provide precise power, exceptional economy and dependable, long-lived durability, there exists a need to provide improvements to result in a further advantageous clutch. Specifically, a need exists to provide a simplified construction in terms of reducing the number of components, reducing the amount of machining required, as well as simplifying assembly. Further, a need exists to provide a fan clutch which is more versatile in the mounting of fan blades of various types and configurations and in differing applications. Further, the rotational control apparatus should overcome deficiencies in prior designs including reducing unintentional leakage of fluid pressure from the cylinder.

SUMMARY

The present invention solves these needs and other problems in the field of rotational control apparatus by providing, in the most preferred form, a bolt extending through an axially extending void formed in at least one axially extending portion and flange of respective first and second shell housings, with the bolt securing the shell housings together, being slideably received in an opening of a tab extending from the outer periphery of a member received in the axially extending portion and flange, and acting as a guide for a spring biasing the member.

In other aspects of the present invention, an O-ring having circular cross sections in an uncompressed condition is received on an axially extending outer surface of a shoulder formed in a first member having an axially extending outer surface of a larger diameter and for slideable receipt in an axially extending inner surface of a second member, with fluid pressure received in a cylinder defined by the first and second members pushing the O-ring against the annular, radially extending surface of the first member.

In still other aspects of the present invention, a step is formed in a first member for pushing an O-ring received on an axially extending surface of a shoulder of a second member, with the first member further having an axially extending surface which is slideably received in a further axially extending surface of the second member.

It is thus an object of the present invention to provide a novel rotational control apparatus.

It is further an object of the present invention to provide such a novel rotational control apparatus in the form of a fan clutch.

It is further an object of the present invention to provide such a novel rotational control apparatus designed to be simple.

It is further an object of the present invention to provide such a novel rotational control apparatus which is reliable.

It is further an object of the present invention to provide such a novel rotational control apparatus having a reduced number of components.

It is further an object of the present invention to provide such a novel rotational control apparatus requiring less machining after casting of the components.

It is further an object of the present invention to provide such a novel rotational control apparatus having a simplified assembly.

It is further an object of the present invention to provide such a novel rotational control apparatus allowing the output to be mounted at different axial positions on the housing.

It is further an object of the present invention to provide such a novel rotational control apparatus reducing unintentional leakage of fluid pressure from the cylinder.

It is further an object of the present invention to provide such a novel rotational control apparatus increasing the cross-sectional area of the piston to thus increase engagement force.

It is further an object of the present invention to provide such a novel rotational control apparatus allowing larger O-rings in the same sized apparatus components.

These and further objects and advantages of the present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
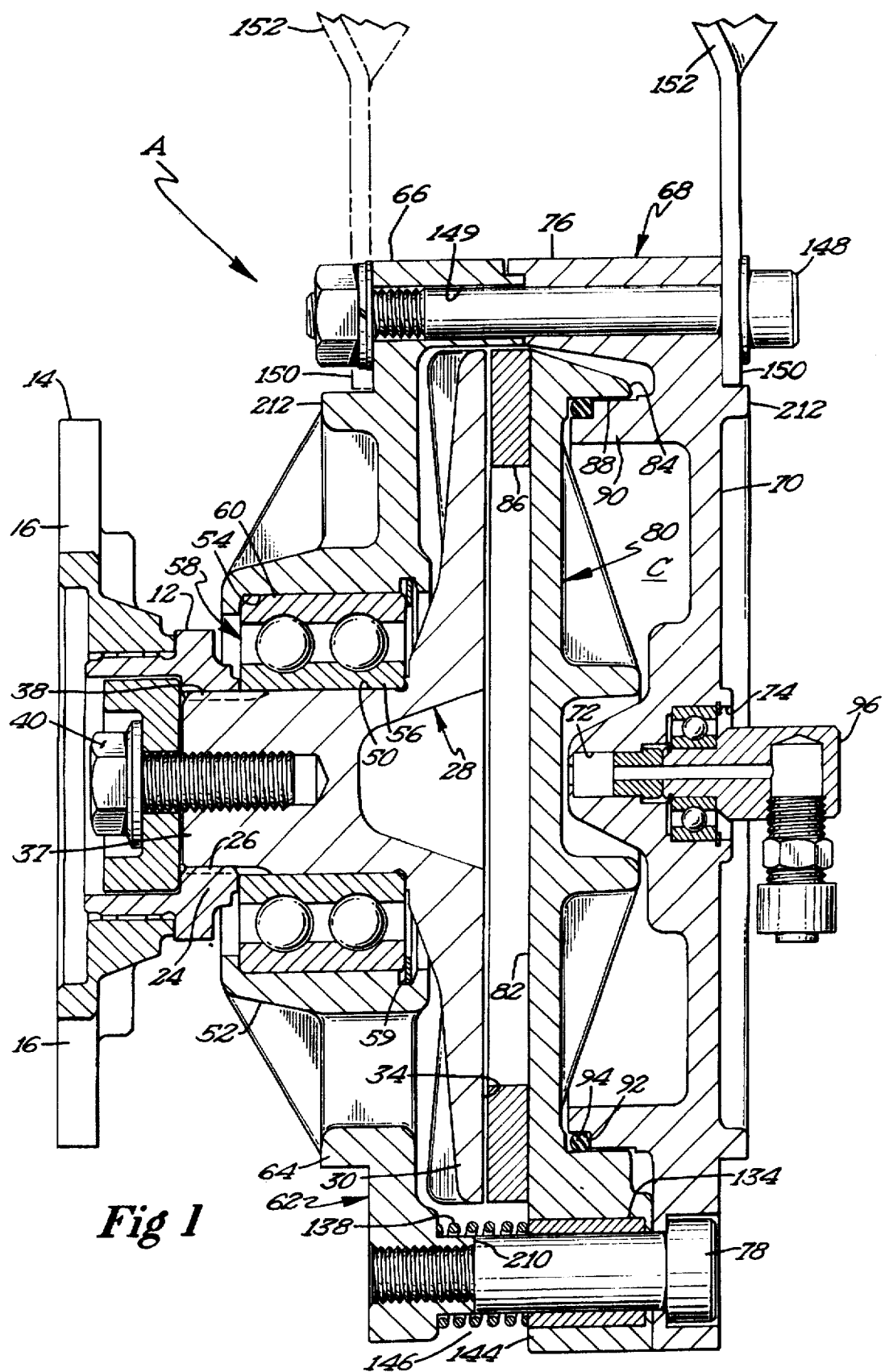
FIG. 1 shows a cross-sectional view of a rotational control apparatus in a first, preferred form of a fan clutch according to the preferred teachings of the present invention.

The figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the figures of the drawings, the same numerals designate the same or similar parts. Furthermore, when the terms "first", "second", "internal", "radial", "axial", "inward", "outward", and similar terms are used herein, it should be understood that these terms have reference only to the structure shown in the drawings as it would appear to a person viewing the drawings and are utilized only to facilitate describing the invention.

DESCRIPTION

Rotational control apparatus according to the preferred teachings of the present invention is shown in the drawings in the preferred form of a fan clutch and is generally designated A. In the most preferred embodiments of the present invention, clutch A of FIG. 1 is an improvement of the type shown and described in U.S. Pat. No. 4,418,807 and in FIGS. 1–3 of U.S. Pat. No. 4,425,993. For purpose of explanation of the basic teachings of the present invention, the same numerals designate the same or similar parts in the present figures and the figures of U.S. Pat. No. 4,425,993. The description of the common numerals and clutch A of FIG. 1 may be found herein and in U.S. Pat. No. 4,425,993, which is hereby incorporated herein by reference.

Referring to the drawings in detail, fluid engaged spring released clutch A includes an annular mount 12 having an annular flange 14 which is formed with a series of spaced holes or slots 16 for bolting or otherwise attaching annular mount 12 to a sheave or other driven member which is rotated about a clutch axis by a conventional mechanism (not shown) within the engine block. Mount 12 includes a hollow hub portion 24 formed with splines 26 thereon.

Further provided is a friction disc 28 including a circular main body portion 30 having an annular friction engageable surface or portion 34. Disc 28 is formed with an axial hub 37 formed with splines 38 in engagement with splines 26 of hub portion 24. Mount 12 is secured and fixed in a splined relationship to friction disc 28 by means of an axially mounted bolt 40 threadedly engaged in hub 37.

Hub 37 is formed with an external annular recess 50. A housing hub 52 is formed with a companion annular recess 54, with the inner race 56 of a bearing 58 press fit in recess 50 and the outer race 60 of bearing 58 press fit in recess 54. Bearing 58 is retained in recess 54 by means of a retaining ring 59 and in recess 50 by mount 12.

Hub 52 is part of a first outer shell housing 62, with hub 52 terminating in an annular and radially extending body portion 64 which terminates in an offset portion 66 located radially outward of friction disc 28 and extending axially from body portion 64 beyond surface 34 of friction disc 28. A second outer shell housing 68 includes an annular main body portion 70 formed with an axial hole 72 terminating outwardly in an annular recess 74. Main body portion 70 terminates radially outwardly in a right angular flange 76 having a shape corresponding to portion 66, with the free edges of portion 66 and flange 76 abutting. In the most preferred form, body portion 66 and flange 76 include circumferentially spaced voids 146 extending axially from portion 64 to portion 70. Cylindrical standoffs 210 extend axially from portion 64 inside of voids 146, with the axial extent of standoffs 210 from portion 64 being less than the axial extent of body portion 66 from portion 64. First outer shell housing 62 is secured to second outer shell housing 68 by means of circumferentially spaced shoulder bolts 78 extending through suitable openings formed in portion 70 and threaded into portion 64, with bolts 78 extending through voids 146. In the most preferred form, bolts 78 include shoulders which abut against the axial free ends of standoffs 210 and which have an outer diameter equal to that of standoffs 210. Thus, housings 62 and 68 are rotatable relative to friction disc 28 by bearing 58 about the clutch axis.

An annular piston 80 includes a circular and center body portion 82 having an outwardly offset and radially disposed annular flange portion 84. An inner annular surface 88 of annular flange 84 forms an axially extending, inner cylindrical surface. Formed internally of main body portion 70 of shell housing 68 is an annular cylindrical flange portion 90 slideably positioned relative to surface 88 of flange 84. On the inner axial end and the axially extending, outer, cylindrical surface of portion 90 is formed an annular shoulder 92 on which is positioned an O-ring 94 in sealing engagement with surface 88 of flange 84 thereby forming a pressure cylinder C. It can then be appreciated that shoulder 92 includes an axially extending, outer, cylindrical surface having a diameter smaller than the diameter of surface 88 and the axially extending, outer, cylindrical surface of portion 90 and larger than the unstretched diameter of O-ring 94. Shoulder 92 extends axially from the free end of portion 90 and terminates in an annular, radially extending surface. O-ring 94 has generally circular cross sections in an uncompressed condition of a diameter less than or equal to the axial spacing of the radially extending surface of shoulder 92 and less than one-half the difference in diameters between the axially extending cylindrical surfaces of portion 90 and shoulder 92.

Positioned and suitably secured within axial hole 72 is a rotary air union 96, with rotary air union 96 providing fluid communication with cylinder C.

A series of bolts 148 each extend through a hole 149 in portion 66 and flange 76 and each extend through a hole in the spider hub portion 150 of fan blades 152. In the most preferred form, both body portions 64 and 70 include pilot shoulders 212 for piloting spider hub portion 150 of fan blades 152, with fan blades 152 being optionally positioned on either axial side of clutch A.

A friction ring 86 is mounted on portion 82 such as by bonding in axial alignment with frictional engagement portion 34 of friction disc 28. Circumferentially spaced and radially extending tabs 144 are formed on the outer periphery of piston 80 and extend into voids 146 formed between shell housings 62 and 68. Axially extending bushings 134 are secured by press fitting in axially extending openings in tabs 144 and slideably receive bolts 78, with the inside diameter of bushings 134 being generally equal to and slideable upon the outer diameter of the shoulder of bolts 78. Springs 138 are sandwiched between body portion 64 and tabs 144, with springs 138 having an internal size for receipt on standoffs 210 and the shoulders of bolts 78. It will be seen that springs 138 normally urge piston 80 and friction facing ring 86 thereon from friction portion 34 of friction disc 28.

In operation of clutch A and assuming mount 12 is being rotated by conventional means hereinbefore referred to, fan blades 152 are rotated about the axis of clutch A by introducing fluid pressure through rotary air union 96 into cylinder C which forces piston 80 in the direction towards friction disc 28 whereby friction ring 86 engages friction disc 28. As a result of the above, which is contrary to the urging of springs 138, housings 62 and 68 with fan blades 152 thereon are rotated generally at the rotational speed of mount 12 and friction disc 28. With the fluid pressure released, springs 138 urge friction ring 86 from engagement with friction disc 28 whereby friction ring 86 is separated or disengaged from friction disc 28.

Now that the construction and method of clutch A according to the preferred teachings of the present invention have been explained, at least some of the advantages of clutch A can be set forth. In particular, it should be realized that bolts 78 perform multiple functions including securing housings 62 and 68 together to prevent relative movement therebetween, rotatably relating but allowing axial movement of piston 80 relative to housings 62 and 68, and acting as guides and holders for springs 138. Prior to the present invention, such functions were performed by two or more separate sets of components. Thus, clutch A according to the teachings of the present invention significantly reduces the number of components necessary and is of a much simpler design. Further, it can be appreciated that such separate sets of components typically involve the use of axial bores which for strength reasons must be circumferentially offset from each other and thus results in a circumferentially cluttered clutch. Therefore, hub portion 150 of fan blades 152 were typically secured by bolts which are threaded into the housing and positioned at only one axial position on the housing of prior clutches. Due to the multiple functions performed by bolts 78 and their associated components, clutch A according to the preferred teachings of the present invention is not circumferentially cluttered allowing bolts 148 to pass through openings 149 in housings 62 and 68 rather than threaded into either housing 62 or 68 and as a result allows positioning of pilot shoulders 212 on both axial ends of housings 62 and 68. Thus, clutch A according to the preferred teachings of the present invention is more versatile in mounting hub portion 150 of fan blades 152 of a variety of types and in a variety of applications.

It is common for O-rings when acting as a gasket type seal between removable components which do not include relative movement therebetween such as between first and second housing components such as shown in U.S. Pat. No. 4,766,986 to be located in a shoulder formed in the free end of one of the components. However, prior to the present invention, O-ring 94 was received in a groove or recess formed in flange portion 90, with such a recess conventionally believed necessary to prevent O-ring 94 from rolling or otherwise moving axially on portion 90 due to the relative movement between the components resulting from the reciprocation of piston 80. It can then be appreciated that the recess is machined into flange portion 90 after housing 68 is cast. Further, the depth of the recess from the cast surface of portion 90 is such that it can extend through the relatively low porosity casting finish and into the higher porosity center of flange portion 90. Especially for light metal die castings such as aluminum, a risk exists that fluid pressure can leak from cylinder C, through the recess, into the higher porosity center, and out the exposed outer surfaces of housing 68. Further, it can be appreciated that the groove or recess must be sufficiently spaced from the free end of flange portion 90 such that the material between the recess and the free end has sufficient structural strength, thus increasing the length of flange portion 90 and/or decreasing the length of the axial movement of piston 80 and/or decreasing the cross sectional size of O-ring 94.

The present invention is then the recognition that O-ring 94 can be located on shoulder 92 without rolling or otherwise moving axially from portion 90 due to the reciprocation of piston 80. Specifically, it is believed that when fluid pressure is provided to cylinder C to move piston 80 away from body portion 70 of housing 68, fluid pressure trying to escape between flange 84 and flange portion 90 pushes O-ring 94 in a direction opposite to its free end and against the radially extending surface of shoulder 92 and against any tendency of flange 84 of rolling or otherwise moving O-ring 94 towards the free end due to frictional forces. In the absence of fluid pressure with piston 80 moving toward body portion 70 of housing 68 under the bias of springs 138, the frictional forces with flange 84 will tend to roll or otherwise move O-ring 94 in a direction opposite to its free end and against the radially extending surface of shoulder 92. Thus, it can be appreciated that O-ring 94 is always moved towards the radially extending surface of shoulder 92 and will not move from portion 90 due to the reciprocation of piston 80.

It can then be appreciated that shoulder 92 of the present invention overcomes the deficiencies of the groove or recess capturing the O-ring in the prior art. Specifically, flange portion 90 can be cast with shoulder 92 formed therein such that minimal, finish-type machining is required. Thus, machining of housing 68 is minimized according to the teachings of the present invention. Further, because machining is minimized, there is less chance that the machining will extend through the relatively low porosity casting finish into the higher porosity center of flange portion 90 and that fluid pressure leakage through housing 68 can occur. Further, it can be appreciated that assembly of O-ring 94 by axial movement onto shoulder 92 is simplified in comparison to radial movement into a recess as was required prior to the present invention. Furthermore, there is a lower risk that O-ring 94 will be twisted when placed onto shoulder 92 according to the teachings of the present invention than when placed in a recess as was previously required.

Additionally, the annular, radially extending surface of shoulder 92 can be positioned closer to the free end of flange portion 90 and/or a larger cross-sectional size of O-ring 94 can be utilized according to the preferred teachings of the present invention without sacrificing the structural integrity of flange portion 90. Further, elimination of the material between the recess and the free end of flange portion 90 according to the preferred teachings of the present invention allows the use of a backing seal between O-ring 94 and the annular radially extending surface of shoulder 92.

Figure 2:
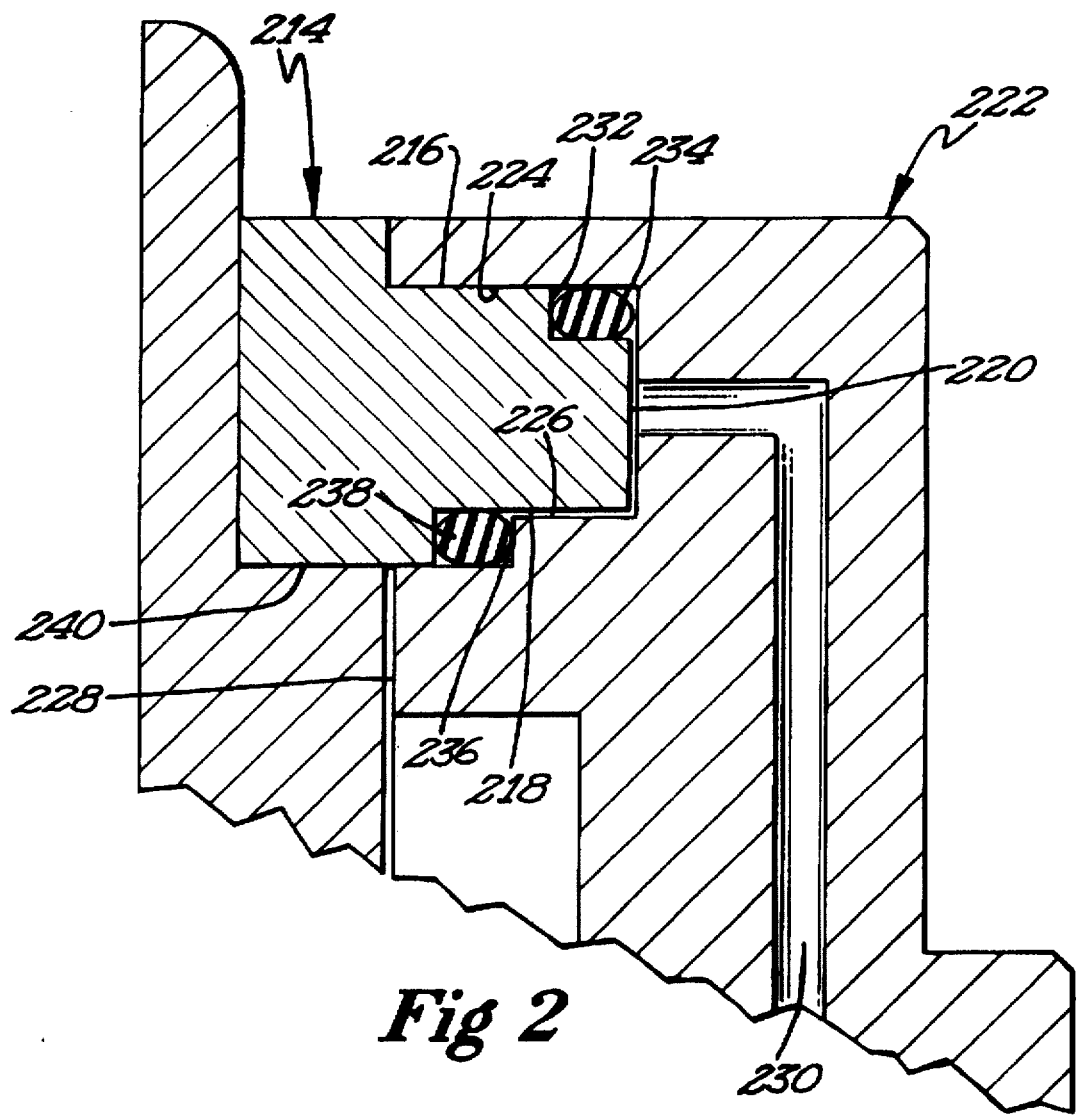
FIG. 2 shows a partial, cross-sectional view of a rotational control apparatus in a second, preferred form of a fan clutch according to the preferred teachings of the present invention.

Further, it can be appreciated that piston 80 can be of other configurations such as annular as shown in U.S. Pat. No. 3,253,687 and as shown in FIG. 2 and designated 214. Particularly piston 214 includes a radially outer, axially extending, cylindrical outside surface 216, a radially inner, axially extending, cylindrical outside surface 218 and a radially extending free end 220. Piston 214 is reciprocally received in a cylinder portion 222 including a radially outer, axially extending, cylindrical inside surface 224 of a size and shape for slideable receipt of surface 216, a radially inner, axially extending, cylindrical inside surface 226 of a size and shape for slideable receipt of surface 218, and a radially extending free end 228. Cylinder C is formed and defined by piston 214 and cylinder portion 222, with a suitable passage 230 formed in cylinder portion 222 for providing fluid pressure to cylinder C.

According to the preferred teachings of the present invention, piston 214 includes a first shoulder 232 extending axially from free end 220 and having a radially outer, axially extending, cylindrical outside surface of a constant diameter along its full axial extent less than the diameter of surface 216 and having an annular, radially extending surface extending from the axially extending cylindrical surface of shoulder 232 to surface 216. An O-ring 234 having circular, uncompressed cross sections of a diameter greater than the radial spacing between the axially extending cylindrical surface of shoulder 232 and surface 216 is positioned on shoulder 232 abutting with the radially extending annular surface of shoulder 232. The unstretched diameter of O-ring 234 is less than the diameter of the axially extending cylindrical surface of shoulder 232. It can then be appreciated that when fluid pressure is provided to cylinder C to move piston 214 out of cylinder portion 222, fluid pressure trying to escape between surfaces 216 and 224 pushes O-ring 234 in a direction opposite to free end 220 and against the radially extending annular surface of shoulder 232 and against any tendency of piston 214 of rolling or otherwise moving O-ring 234 towards free end 220 due to frictional forces. In the absence of fluid pressure within cylinder C and with piston 214 moving into cylinder portion 222, the frictional forces between O-ring 234 and surface 216 with tend to roll or otherwise move O-ring 94 in a direction opposite to free end 220 and against the radially extending annular surface of shoulder 232. Thus, shoulder 232 and O-ring 234 operate similarly to and obtain the advantages of shoulder 92 and O-ring 94 according to the teachings of the present invention with shoulder 232 eliminating the machining of a groove or recess in piston 214 and the disadvantages resulting therefrom.

According to the preferred teachings of the present invention, cylinder portion 222 includes a second shoulder 236 extending axially from free end 228 and having an axially extending, cylindrical, inside surface of a constant diameter along its full axial extend less than the diameter of surface 226 and having a radially extending annular surface extending from the axially extending cylindrical surface of shoulder 236 to surface 226. An O-ring 238 having circular, uncompressed cross sections of a diameter greater than the radial spacing between the axially extending cylindrical surface of shoulder 236 and surface 226 is positioned on shoulder 236 generally abutting with the radially extending annular surface of shoulder 236. O-ring 238 has an unstretched diameter smaller than the diameter of the axially extending cylindrical surface of shoulder 236. Additionally, according to the preferred teachings of the present invention, piston 214 includes a radially inner step 240 having an axially extending cylindrical surface of a constant diameter along its full axial extent generally equal to and for slideable receipt in the axially extending cylindrical surface of shoulder 236 and having a radially extending annular surface extending from the axially extending cylindrical surface of step 240 to surface 218. With piston 214 in its innermost position relative to cylinder portion 222, the radially extending annular surface of step 240 is located axially outwardly of the radially extending annular surface of shoulder 236 by a distance at least equal to and slightly larger than the uncompressed diameter of the cross sections of O-ring 238. It can then be appreciated that when fluid pressure is provided to cylinder C to move piston 214 out of cylinder portion 222, fluid pressure trying to escape between surfaces 218 and 226 pushes O-ring 234 in a direction opposite to free end 220. However, due to the small flow area provided between surfaces 218 and 226, the force applied on O-ring 234 is minimal. In the absence of fluid pressure within cylinder C and with piston 214 moving into cylinder portion 222, the frictional forces between O-ring 238 and surface 226 will tend to roll or otherwise move O-ring 238 in a direction towards free end 220 and against the radially extending annular surface of shoulder 236. Additionally, if sufficiently spaced from the radially extending annular surface of shoulder 236, O-ring 238 will be pushed by the radially extending annular surface of step 240 towards the radially extending annular surface of shoulder 236. Thus, shoulder 236, O-ring 238, and step 240 according to the teachings of the present invention eliminate the machining of a groove or recess in cylinder portion 222 and the disadvantages resulting therefrom.

Actuation of clutch A according to the preferred teachings of the present invention occurs when fluid pressure forces piston 80 or 214 whereby friction ring 86 engages friction disc 28 mounted upon the driven belt sheave. Friction ring 86 then transmits the torque to fan blades 152. Among other factors, the level of torque delivered to fan blades 152 varies with the engagement force supplied by piston 80 or 214. Engagement force is determined by the fluid pressure used to actuate piston 80 or 214 and the cross-sectional area of piston 80 or 214, with the engagement force increasing linearly with fluid pressure and the cross-sectional area of piston 80 or 214. Fluid pressure on a typical diesel truck manufactured in the United States of America will vary from 90 to 120 pounds per square inch (6.3 to 8.4 kilograms per square centimeter). Clutch A of the most preferred form shown is designed to carry the required torque at the minimum fluid pressure.

The size of piston 80 or 214 is limited by weight, economic factors, and by its relationships with interconnecting parts such as fan blades 152 and bearing 58. It is then desired to maximize the area of piston 80 or 214 without violating these size constraints. It can then be appreciated that the cross-sectional area of piston 214 can be maximized according to the teachings of the present invention. Specifically to maximize cross-sectional area, it is desired to maximize the diameter of surfaces 216 and 224 and minimize the diameter of surfaces 218 and 226. It can then be appreciated that the diameter of the component that the radially inner axially extending outside surface of cylinder portion 222 must fit over limits the minimum material required between the radial inner extending outside surface and surface 226 of cylinder portion 222 to maintain structural integrity of cylinder portion 222 and the depth of prior recesses. In turn, the depth of prior recesses minimized the cross-sections of O-rings 94, 234, and 238. Further, it can be appreciated that such limitations on the diameter of surface 226 and the cross-sections of O-rings 94, 234, and 238 in turn resulted in increased diameter of surface 218 and in decreased cross-sectional area of piston 214. According to the preferred teachings of the present invention, the diameter of surfaces 218 and 226 can be minimized to maximize the cross-sectional area of piston 214 and maximize the cross-sections of O-rings 94, 234, and 238 and the seal width while minimizing the axial length while maintaining structural integrity.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

We claim:

1. Rotational control apparatus comprising, in combination: a first shell housing including an axially extending annular portion having a free edge and a shape; a second shell housing including an axially extending annular flange having a free edge and a shape corresponding to the shape of the axially extending portion, with the free edges of the axially extending portion and of the axially extending flange abutting; an axially extending void formed in at least one of the axially extending flange and the axially extending portion; a bolt extending between the first and second shell housings for securing the first and second shell housings together to prevent relative movement therebetween, with the bolt extending through the void; a member having an outer periphery of a size for receipt within the annular portion and the annular flange, with the member including a tab extending from the outer periphery into the void, with the tab including an opening for axial slideable receipt of the bolt within the void; and a spring located on the bolt in the void and intermediate the first shell housing and the member for biasing the member toward the second shell housing, with the member being reciprocal in a direction parallel to the bolt and rotatable with the first and second shell housings.

2. The rotational control apparatus of claim 1 wherein the first shell housing includes a cylindrical standoff extending axially within the void, with the bolt extending through the cylindrical standoff, with the spring having an internal size for receipt on the cylindrical standoff.

3. The rotational control apparatus of claim 2 wherein the cylindrical standoff includes a free end and an outside diameter; and wherein the bolt includes a shoulder having an outside diameter equal to the outside diameter of the cylindrical standoff and abutting with the free end of the cylindrical standoff.

4. The rotational control apparatus of claim 3 wherein the member comprises a piston; and wherein the rotational control apparatus further comprises, in combination: means for providing fluid pressure for forcing the piston toward the first shell housing.

5. The rotational control apparatus of claim 4 further comprising, in combination: an O-ring having circular cross sections of a diameter in an uncompressed condition, with the second shell housing including a cylinder portion having a free end and an outer surface, with the outer surface having a diameter; an annular shoulder formed on the cylinder portion extending axially from the free end and having an outer diameter less than the diameter of the outer surface slightly less than two times the diameter of the cross sections of the O-ring, with the O-ring being received on the shoulder, with the piston including an annular piston portion having an inner surface of a diameter for slideable receipt on the outer surface of the cylinder portion, with the O-ring providing a fluid seal between the cylinder portion and the piston portion.

6. The rotational control apparatus of claim 5 wherein the outer diameter of the annular shoulder is of a constant size from the free end along its full axial extent.

7. Apparatus comprising, in combination: a first member including a first, axially extending, outer cylindrical surface having a diameter and a free end; a second member including a second, axially extending, inner cylindrical surface having a diameter generally equal to and for slideable receipt of the first surface, with a cylinder for receipt of fluid pressure defined by the first and second members with the application of fluid pressure axially moving the first and second members relative to each other from a first position to a second position; a first shoulder formed in the first member including a third, axially extending, outer, cylindrical surface having a diameter smaller than the diameters of the first and second surfaces and extending axially from the free end of the first member and terminating in an annular, radially extending surface at a first axial spacing from the free end of the first member; a first O-ring located on the third surface for sealing engagement with the second surface at all times between the first and second positions, with fluid pressure in the cylinder pushing the first O-ring against the annular, radially extending surface of the first member; wherein the first member includes a fourth, axially extending, cylindrical surface having a diameter smaller than the diameters of the first, second, and third surfaces; wherein the second member includes a fifth, axially extending, cylindrical surface having a diameter generally equal to and for slideable receipt of the fourth cylindrical surface; wherein the second member includes a free end; a second shoulder formed in the second member including a sixth, axially extending, cylindrical surface having a diameter smaller than the diameters of the first, second, third, fourth, and fifth cylindrical surfaces and extending axially from the free end of the second member and terminating in an annular, radially extending surface at a second axial spacing from the free end of the second member; and a second O-ring located on the sixth surface for sealing engagement with the fourth surface at all times between the first and second positions.

8. The apparatus of claim 7 wherein the diameter of the third surface is of a constant size throughout the first axial spacing.

9. The apparatus of claim 7 wherein the first O-ring has generally circular cross sections in an uncompressed condition of a diameter less than or equal to the first axial spacing, with the second O-ring having generally circular cross sections in an uncompressed condition of a diameter less than the second axial spacing.

10. The apparatus of claim 9 wherein the diameter of the generally circular cross sections of the second O-ring in the uncompressed condition is of a diameter substantially less than the second axial spacing.

11. The apparatus of claim 10 wherein the first member includes a step having a seventh, axially extending, cylindrical surface having a diameter generally equal to and for slideable receipt of the sixth surface, with the seventh surface terminating in an annular, radially extending surface, with a third axial spacing being defined between the annular, radially extending surfaces of the second shoulder and the step and being at least equal to the diameters of the cross sections of the second O-ring in the absence of fluid pressure in the cylinder, with the annular, radially extending surface of the step pushing the second O-ring on the sixth surface towards the annular, radially extending surface of the second shoulder in the event that the second O-ring moves on the sixth surface greater than the third axial spacing from the annular, radially extending surface of the second shoulder.

12. The apparatus of claim 7 wherein the diameter of the sixth surface is of a constant size throughout the second axial spacing.

13. The apparatus of claim 7 wherein the first member comprises, in combination: a first shell housing including an axially extending annular portion having a free edge and a shape; a second shell housing including an axially extending annular flange having a free edge and a shape corresponding to the shape of the axially extending portion, with the free edges of the axially extending portion and of the axially extending flange abutting; an axially extending void formed in at least one of the axially extending flange and the axially extending portion; a bolt extending between the first and second shell housings for securing the first and second shell housings together to prevent relative movement therebetween, with the bolt extending through the void, with the second member having an outer periphery of a size for receipt within the annular portion and the annular flange, with the second member including a tab extending from the outer periphery into the void, with the tab including an opening for axial slideable receipt of the bolt within the void; and a spring located on the bolt in the void and intermediate the first shell housing and the second member for biasing the second member toward the second shell housing, with the second member being reciprocal in a direction parallel to the bolt and rotatable with the first and second shell housings.

14. Apparatus comprising, in combination: a first member including a first, axially extending, outer cylindrical surface having a diameter and a free end; a second member including a second, axially extending, inner cylindrical surface having a diameter generally equal to and for slideably receiving the first surface, with a cylinder for receipt of fluid pressure defined by the first and second members with the application of fluid pressure axially moving the first and second members relative to each other from a first position to a second position; a first shoulder formed in the second member including a third, axially extending, inner, cylindrical surface having a diameter smaller than the diameters of the first and second surfaces and extending axially from the free end and terminating in an annular, radially extending surface at a first axial spacing from the free end; and a first O-ring located on the third surface for sealing engagement with the first surface at all times between the first and second positions.

15. The apparatus of claim 14 wherein the diameter of the third surface is of a constant size throughout the first axial spacing.

16. The apparatus of claim 15 wherein the first O-ring has generally circular cross sections in an uncompressed condition of a diameter less than the first axial spacing.

17. The apparatus of claim 14 wherein the first member includes a step terminating in an annular, radially extending surface, with a second axial spacing being defined between the annular, radially extending surfaces of the first shoulder and the step and being at least equal to the diameters of the cross sections of the O-ring in the absence of fluid pressure in the cylinder, with the annular, radially extending surface of the step pushing the second O-ring on the third surface towards the annular, radially extending surface of the shoulder in the event that the O-ring moves on the third surface greater than the second axial spacing from the annular, radially extending surface of the second shoulder.

18. The apparatus of claim 17 wherein the step includes a fourth, axially extending, outer cylindrical surface having a diameter generally equal to and for slideable receipt in the third surface.

19. The apparatus of claim 18 wherein the firs member includes a fifth, axially extending, outer cylindrical surface having a diameter larger than the diameters of the first, second, and third surfaces; wherein the second member includes a sixth, axially extending, inner cylindrical surface having a diameter generally equal to and for slideably receiving the fifth surface; and wherein the apparatus further comprises, in combination: means for sealing between the fifth and sixth surfaces at all times between the first and second positions.

20. Rotational control apparatus comprising, in combination: a first shell housing including an axially extending annular portion having a free edge and a shape and including a first, axially extending, outer cylindrical surface having a diameter and a free end; a second shell housing including an axially extending annular flange having a free edge and a shape corresponding to the shape of the axially extending portion, with the free edges of the axially extending portion and of the axially extending flange abutting; an axially extending void formed in at least one of the axially extending flange and the axially extending portion; a bolt extending between the first and second shell housings for securing the first and second shell housings together to prevent relative movement therebetween, with the bolt extending through the void; a member having an outer periphery of a size for receipt within the annular portion and the annular flange, with the member including a tab extending from the outer periphery into the void, with the tab including an opening for axial slideable receipt of the bolt within the void, with the member further including a second, axially extending, inner cylindrical surface having a diameter generally equal to and for slideable receipt of the first surface, with a cylinder for receipt of fluid pressure defined by the first shell housing and the member with the application of fluid pressure axially moving the first shell housing and the member relative to each other from a first position to a second position; a spring located on the bolt in the void and intermediate the first shell housing and the member for biasing the member toward the second shell housing, with the member being reciprocal in a direction parallel to the bolt and rotatable with the first and second shell housings; a first shoulder formed in the first shell housing including a third, axially extending, outer, cylindrical surface having a diameter smaller than the diameters of the first and second surfaces and extending axially from the free end and terminating in an annular, radially extending surface at a first axial spacing from the free end; and a first O-ring located on the third surface for sealing engagement with the second surface at all times between the first and second positions, with the first O-ring having generally circular cross sections in an uncompressed condition of a diameter less than or equal to the first axial spacing and less than one-half the difference in diameters between the second and third surfaces, with fluid pressure in the cylinder pushing the O-ring against the annular, radially extending surface of the first shell housing.

* * * * *